[54] DRILLING FLUID PREPARATION

[72] Inventor: Claud D. Branscum, Bartlesville, Okla.

[73] Assignee: Phillips Petroleum Company

[22] Filed: Aug. 28, 1969

[21] Appl. No.: 853,937

[52] U.S. Cl. ..................................................252/8.5 A
[51] Int. Cl. ......................................C10m 3/02, C10m 3/22
[58] Field of Search..............252/8.5 A, 8.5 C, 8.5 P, 8.55 A

[56] References Cited

UNITED STATES PATENTS

| 2,425,768 | 8/1947 | Wagner | 252/8.5 |
| 3,024,191 | 3/1962 | Jones | 252/8.55 |
| 3,284,352 | 11/1966 | Burdyn et al. | 252/8.5 |
| 3,471,402 | 10/1969 | Shannon et al. | 252/8.5 |
| 3,506,644 | 4/1970 | Parker | 252/8.5 |

OTHER PUBLICATIONS

Kaveler, Improved Drilling Muds Contain Carboxymethylcellulose, Article in the Oil and Gas Journal, Vol. 45, July 6, 1946, pages 81, 82, 85, 86 and 89.

Primary Examiner—Herbert B. Guynn
Attorney—Young and Quigg

[57] ABSTRACT

A method of preparing an improved drilling fluid of an inorganic salt and a carboxyalkylcellulose is disclosed in which the carboxyalkylcellulose is dissolved in the water and the inorganic salt is added to the solution thereafter.

7 Claims, No Drawings

DRILLING FLUID PREPARATION

This invention relates to drilling fluid preparation.

In one of its more specific aspects, this invention relates to a method of drilling fluid preparation which maximizes the desired properties of the resulting solution.

The use of drilling fluids is well known. One such fluid comprises an aqueous solution of a carboxyalkylcellulose, for example, carboxymethylcellulose, and an inorganic salt such as calcium chloride. Such solutions are desirably of high density and accordingly, they contain a quantity of the inorganic salt which approaches the maximum as limited by the solubility of the salt in the aqueous medium. These solutions normally contain the carboxyalkylcellulose for controlling water loss.

It has now been discovered that the more desirable properties of such drilling fluids are significantly affected by their method of preparation. This invention is directed to a method of preparing solutions which possess these more desirable properties to an extent heretofore not obtainable.

According to the method of this invention, there is provided a process for preparing drilling fluids having improved water loss properties and comprising an aqueous solution of a carboxyalkylcellulose and an inorganic salt which comprises preparing the carboxyalkylcellulose solution and dissolving the inorganic salt therein.

In one embodiment of this invention, the solution is maintained at substantially ambient temperatures while incorporating the inorganic salt.

In another embodiment of this invention, the solution is aged after preparation for a period of from about 4 to about 16 hours at a temperature less than about 210° F.

The method of this invention contemplates the preparation of an aqueous solution comprising an inorganic salt, a carboxyalkylcellulose, the solution being of such composition as is conventionally available and including such extraneous materials as are conventionally found therein.

The inorganic salt comprising the solute of these solutions includes calcium chloride, sodium chloride, potassium chloride, sodium nitrate, and mixtures thereof of such purity and in such form as are conventionally employed in the preparation of drilling fluids.

The carboxyalkylcellulose includes the conventionally employed materials belonging to the class, including carboxymethylcellulose. In general, these materials are polyanionic cellulosic polymers of high molecular weight, are available commercially and include such materials as Drispac as available from Drilling Specialties Company, Bartlesville, Oklahoma.

The method of this invention is not to preclude from that basic solution whose preparation is primarily concerned herein, the inclusion of other conventional additives.

For the purpose of simplication, the following description will be expressed in terms of calcium chloride and carboxymethylcellulose without meaning to limit the invention thereto.

The method of this invention contemplates the preparation of this solution comprising the various components in the percentages in which they are conventionally employed. The calcium chloride will be used in an amount from about 94 to about 220 pounds per 42 gallon barrel of aqueous solution, preferably from about 130 to about 192 pounds per barrel.

The carboxymethylcellulose will be employed in an amount from about 0.25 to about 4.0 pounds per 42 gallon barrel, preferably from about 0.5 to about 2.5 pounds per barrel.

The conventional method of preparing solutions comprising the aforementioned components involves forming the calcium chloride solution and adding the carboxymethylcellulose thereto. The method of this invention involves the dissolution of the carboxymethylcellulose in the aqueous solution to the desired concentration and the addition of the calcium chloride to the solution so formed. Additional improvement in the properties of the solution can be realized if it is subsequently aged or maintained for a period from about 4 to about 20 hours, preferably from about 12 to about 16 hours at a temperature up to about 210° F., preferably at a temperature of about 165° to about 185° F.

The following data are indicative of the unexpected properties of solutions prepared in accordance with the method of this invention.

Sample 1, for which data are presented below, was prepared by dissolving commercially available calcium chloride in water to a solution weight of 12.0 pounds per gallon. The carboxymethylcellulose compound, Drispac, was introduced into the solution to the extent of 2.0 pounds per 42 gallon barrel. The solution was immediately tested. Thereafter, the solution was permitted to age for a period of 16 hours at a temperature of 150° F. after which it was again tested.

Sample 2 was prepared according to the method of this invention. The carboxymethylcellulose compound, Drispac, was introduced into water to a concentration of 2.0 pounds per 42 gallon barrel. Calcium chloride was then added to the resulting solution until the solution weight was 12.0 pounds per gallon. The solution was immediately tested. Thereafter, the solution was permitted to age for a period of 16 hours at a temperature of 176° F. after which it was again tested.

Results were as follows:

TABLE I

| Sample No. | Initial Tests | | Tests after Aging | |
|---|---|---|---|---|
| | Plastic Viscosity Yield Point | Water Loss, ml. | Plastic Viscosity Yield Point | Water Loss, ml. |
| 1 | – | 86 | 16–1 | 8.0 |
| 2 | 51–89 | 1.9 | 63–74 | 0.0 |

Plastic viscosity, yield point, and water loss were determined in accordance with API RP 13B, 2nd Ed., April 1969, "Standard Procedure for Testing Drilling Fluids," American Petroleum Institute, Division of Production, Dallas, Texas.

The above data indicate the operability of the method of this invention.

They further indicate the improvement attained not only as a result of the order of incorporating the various components in the solution but also as a result of aging such solutions under the conditions previously defined.

It is to be understood that in the dissolution of the calcium chloride in the aqueous solution of the carboxymethylcellulose, the temperature of the solution will increase as a result of the heat of dissolution and that this heat can be employed to increase the temperature of the solution to that temperature at which it is aged. However, it is preferable to remove the heat of dissolution and to maintain the solution at a temperature of between about 75° F. and about 100° F. while incorporating the calcium chloride.

Maintaining the temperature of the solution substantially constant when adding the calcium chloride to the carboxymethylcellulose solution affects the water loss of the resulting solution in the absence of after-aging. This is shown by the following data developed in the preparation of a solution comparable to sample II above.

TABLE II

| Solution Maintained Substantially Constant at Temperature, °F. | Water Loss of Resulting Solution, ml./30 minutes |
|---|---|
| 75 | 3.9 |
| 100 | 4.5 |
| 125 | 6.5 |
| 150 | 7.6 |

In contrast, the following data are the result of adding the carboxymethylcellulose to the calcium chloride solution.

TABLE III

| Solution Maintained | Hours at | Water Loss of Resulting |

| at Temperature, °F. | Temp. | Solution, ml./30 minutes |
|---|---|---|
| 100 | 4 | 29.0 |
| 125 | 4 | 26.7 |
| 150 | 1 | 68.5 |
| 150 | 4 | 21.1 |
| 175 | 1 | 22.5 |
| 175 | 4 | 13.0 |

The data of table II show that the method of this invention should be preferably employed at low solution temperatures. This is in contrast to expectations inasmuch as the data of table III, in which the carboxymethylcellulose was added to calcium chloride solution in the conventional manner, indicates that lower water loss results if the solution is maintained at higher temperatures.

It will be appreciated that various modifications can be made to the method of this invention in the light of the foregoing disclosure. However, such is considered as being within the scope of the invention.

What is claimed is:

1. A method of preparing a drilling fluid consisting essentially of an aqueous solution of an inorganic salt selected from the group consisting of calcium chloride, sodium chloride, potassium chloride and sodium nitrate and carboxymethylcellulose which comprises:
    a. forming an aqueous solution of carboxymethylcellulose, said carboxymethylcellulose being contained in said solution in an amount within the range of about 0.5 to about 2.5 pounds per barrel of solution;
    b. dissolving at least one of said inorganic salts in said aqueous solution to produce a solution substantially saturated with said inorganic salt; and,
    c. aging the solution of step (b) by maintaining said solution at a temperature within the range of about 165° to 185° F. for a period of from about 4 to about 20 hours.

2. The method of claim 1 in which said inorganic salt comprises calcium chloride.

3. The method of claim 2 in which said aqueous solution is maintained at a temperature within the range of about 75° F. to about 100° F. during said dissolving of said calcium chloride.

4. The method of claim 2 in which said carboxymethylcellulose is present in said solution in an amount within the range of from about 0.25 to about 4.0 pounds per barrel of solution and said calcium chloride is dissolved in said aqueous solution in an amount within the range of about 94 to about 220 pounds per barrel of solution.

5. The method of claim 4 in which said carboxymethylcellulose is present in said solution in an amount of about 2 pounds per barrel, and said solution is aged for a period of about 16 hours at a temperature of about 176° F.

6. The method of claim 3 in which said carboxymethylcellulose is present in said solution in an amount of about 2 pounds per barrel and said solution is aged for a period of about 16 hours at a temperature of about 176° F.

7. The method of claim 3 in which said solution is maintained at a temperature of about 75° F during said dissolving of said calcium chloride.

* * * * *